Patented June 5, 1945

2,377,499

UNITED STATES PATENT OFFICE 2,377,499

METHOD OF PREPARING MELAMINE

David W. Jayne, Jr., Old Greenwich, and Harold M. Day, Cos Cob, Conn., assignors to American Cyanamid Company, New York, N. Y., a corporation of Maine No Drawing. Application August 9, 1941, Serial No. 406,166

4 Claims. (Cl. 260—249.5)

This invention relates to a method of preparing melamine from cyanamide or dicyandiamide.

Melamine has previously been prepared from cyanamide and dicyandiamide by merely heating these materials to temperatures approximating their melting point. The reaction is exothermic, however, and proceeds rapidly with almost explosive violence accompanied by the evolution of large quantities of ammonia and the production of undesirable amounts of deamination products of melamine such as melam, melem, and related products.

We have found that melamine may be prepared from cyanamide or dicyandiamide to much greater advantage with high yields and without the formation of unduly large quantities of ammonia and other by-products by simply heating cyanamide or dicyandiamide in molten potassium thiocyanate. Our new process is also advantageous in that it enables us to obtain melamine of a high degree of purity in good yields without the use of ammonia and high working pressures with the attendant necessity of using expensive pressure autoclaves. We are also enabled to isolate the melamine formed in the reaction, eliminate small percentages of by-products formed and recover the unreacted dicyandiamide and potassium thiocyanate for reuse in the process merely by appropriate treatment with water as will be presently described.

In carrying out our process we ordinarily make a mixture of substantially equal parts by weight of dicyandiamide and substantially anhydrous potassium thiocyanate. The mixture is heated in an open vessel, if desired, and at a temperature somewhat lower than the melting point of the potassium thiocyanate, i. e., in the range of about 130–170° C., the materials melt to form a clear homogeneous solution. The heating is continued and the temperature of the reaction mixture allowed to rise slowly. It is not usually necessary to heat the melt to a temperature over about 225° C. but higher temperatures, as for example 250° C., may be employed without serious consequences. During the heating period the dicyandiamide undergoes an exothermic molecular rearrangement whereby melamine is produced. The conversion takes place quietly and is complete in a short period of time without an unduly high temperature being attained and with the elimination of only about 0.20 mole of ammonia per mole of dicyandiamide employed in the reaction mixture. The product, which is a granular, viscous mass, is then allowed to cool with the formation of a dry white cake consisting of melamine, unconverted dicyandiamide, potassium thiocyanate, and small amounts of deamination products of melamine.

The reaction product when cooled may be ground to a powder and then slurried with water at 50–80° C. to dissolve the unreacted dicyandiamide and potassium thiocyanate. The slurry is then filtered and the filter cake is washed with water. The filtrate which contains the unreacted dicyandiamide and potassium thiocyanate may be evaporated to dryness and employed again in a succeeding run. Alternatively, the filtrate and washings may be evaporated to a small volume and cooled to crystallize out dicyandiamide which may be recovered by filtration. The filtrate which contains potassium thiocyanate may then be evaporated to dryness and the potassium thiocyanate recovered for reuse.

The filter cake obtained from the warm water slurry described above contains principally melamine together with small amounts of insoluble deamination products of melamine. For certain purposes such as in the production of molding compositions this material may be used as obtained. However, when melamine of a high degree of purity is desired for reaction with formaldehyde in the production of melamine resins for paints, lacquers, molding compositions, etc., the filter cake is slurried in boiling water and the boiling slurry immediately filtered. Melamine being soluble in boiling water is found in the filtrate and may be recovered by crystallization. The insoluble residue remains, of course, on the filter and may be discarded.

Although we ordinarily use approximately equal parts by weight of dicyandiamide and potassium thiocyanate we may use a somewhat smaller amount of potassium thiocyanate as for example ½ part by weight with each part by weight of dicyandiamide. On the other hand we may use as much as two parts by weight of potassium thiocyanate for each part of dicyandiamide when it is desired to obtain a more fluid reaction product which may be poured directly from the reaction vessel into water, thereby avoiding the necessity of cooling and grinding the product.

We have also found that alkali metal salts of weak non-oxidizing acids may be added to the dicyandiamide-potassium thiocyanate mixture and the whole melted to produce melamine with good results. The alkali metal salts of weak non-oxidizing acids tend to lower the melting point of the mixture, control the exothermic reaction and increase the yields of melamine. Potassium carbonate and guanidine carbonate are illustrated in Examples 2 and 3 in conjunction with dicyandiamide and potassium thiocyanate as described.

Our invention will now be illustrated in greater detail by the following examples. While specific details are described it will be understood that these examples are given primarily for purposes of illustration and our invention in its broader aspects is not limited thereto.

*Example 1*

A mixture of 30 parts by weight of dicyandiamide and 30 parts by weight of anhydrous potassium thiocyanate was heated in an open vessel to about 170° C. whereupon a clear, homogeneous melt resulted. Heating was continued slowly until after about 30 minutes it was at a temperature of about 225° C. and had become an opaque, viscous mass. The reaction product was then cooled and pulverized.

The resulting dry white powder was slurried in 100 parts of warm water at 75° C., the slurry filtered and the filter cake washed with 20 parts of water. The filter cake was then slurried in 800 parts of boiling water and the boiling slurry immediately filtered, yielding 3.5 parts of insoluble material (melam, etc.). The filtrate contained 14 parts of melamine which was recovered by crystallization.

The combined original filtrate and washings from the reaction melt were evaporated to a small volume, cooled and filtered, yielding 9 parts of dicyandiamide which was returned to a subsequent run. The filtrate from this filtering operation was evaporated to dryness yielding 30 parts of potassium thiocyanate which was also returned to the next run.

The yield of melamine based on the unrecovered dicyandiamide was approximately 67%.

*Example 2*

A mixture of 200 parts by weight of dicyandiamide, 400 parts by weight of potassium thiocyanate and 150 parts by weight of potassium carbonate was heated in an open vessel to 150° C. whereupon a clear, homogeneous melt was obtained. The melt was then slowly heated to 210° C. and then cooled to room temperature and pulverized.

The resulting dry white powder was slurried in one liter of warm water to remove potassium thiocyanate and potassium carbonate in solution. The filter cake was washed and dried. Analysis of this material showed that it contained 100 parts by weight of melamine and 35 parts by weight of insoluble material.

*Example 3*

A mixture of 200 parts by weight of dicyandiamide, 400 parts by weight of potassium thiocyanate and 200 parts by weight of guanidine carbonate was heated in an open vessel to a temperature of 130° C. whereupon a clear, homogeneous melt was obtained. Heating was continued slowly over a period of about one-half hour, at the end of which time the reaction mixture was at a temperature of 210° C. The product, an opaque, viscous mass, was then cooled and pulverized.

The resulting dry white powder was slurried in 600 parts of warm water, the slurry filtered and the filter cake washed with a small amount of water. The filtrate was evaporated to dryness to recover 350 parts of potassium thiocyanate. The filter cake was reslurried in 5400 parts of boiling water and the boiling slurry immediately filtered. The insoluble filtration residue, after drying, consisted of 67 parts by weight of melam and other products. The filtrate was cooled at 25° C. and filtered to recover 147 parts by weight of pure melamine. The filtrate from this filtration was found to contain an additional 33 parts by weight of melamine and 50 parts by weight of potassium thiocyanate which could be recovered. The total melamine obtained was 180 parts by weight, representing a yield based on the dicyandiamide used of 90%.

What we claim is:

1. A method of preparing melamine which comprises the step of heating to a temperature of at least 130° C. a mixture of potassium thiocyanate and a member of the group consisting of cyanamide and dicyandiamide to melt the same and continuing the heating at a temperature not in excess of 250° C. until melamine is formed and recovering melamine and unreacted potassium thiocyanate therefrom.

2. A method of preparing melamine which comprises the step of heating to a temperature of at least 130° C. a solid mixture of 0.5–2.0 parts by weight of potassium thiocyanate and one part by weight of a member of the group consisting of cyanamide and dicyandiamide to melt the same and continuing the heating at a temperature not in excess of 250° C. until melamine is formed and recovering melamine and unreacted potassium thiocyanate therefrom.

3. A method of manufacturing melamine which comprises mixing 0.5–2.0 parts by weight of substantially anhydrous potassium thiocyanate with one part by weight of dicyandiamide, heating the mixture to a temperature of at least 130° C. to melt the same and continuing the heating at a temperature not in excess of 250° C. until melamine is formed, treating the resulting reaction product with warm water to dissolve unreacted dicyandiamide and potassium thiocyanate, then treating the undissolved residue with boiling water to dissolve melamine and recovering melamine from the resulting solution.

4. A method of preparing melamine which comprises mixing substantially equal parts by weight of dicyandiamide and anhydrous potassium thiocyanate, heating the mixture to a temperature of at least 130° C. to melt the same and continuing the heating to a temperature of approximately 225° C., cooling the reaction product and grinding it to a powder, slurrying the powder in warm water to dissolve unreacted dicyandiamide and potassium thiocyanate, separating melamine and insoluble products from the solution as an undissolved residue, dissolving the melamine from the residue in boiling water, separating it from insoluble material, and recovering melamine from the solution by crystallization.

DAVID W. JAYNE, Jr.
HAROLD M. DAY.